United States Patent [19]

Bennett

[11] Patent Number: 5,734,909
[45] Date of Patent: Mar. 31, 1998

[54] METHOD FOR CONTROLLING THE LOCKING AND UNLOCKING OF SYSTEM RESOURCES IN A SHARED RESOURCE DISTRIBUTED COMPUTING ENVIRONMENT

[75] Inventor: Robert Bradley Bennett, Endwell, N.Y.

[73] Assignee: International Business Machines Corporation, Armonk, N.Y.

[21] Appl. No.: 522,689

[22] Filed: Sep. 1, 1995

[51] Int. Cl.$^6$ .................................................. G06F 12/14
[52] U.S. Cl. .......................... 395/726; 395/608; 395/479; 395/200.08
[58] Field of Search ............................... 395/726, 200.03, 395/200.08, 200.09, 288, 479, 608

[56] References Cited

U.S. PATENT DOCUMENTS

| | | |
|---|---|---|
| 5,175,852 | 12/1992 | Johnson et al. ........................ 395/608 |
| 5,202,971 | 4/1993 | Henson et al. ......................... 395/608 |
| 5,226,159 | 7/1993 | Henson et al. ......................... 395/726 |
| 5,285,528 | 2/1994 | Hart . |
| 5,287,521 | 2/1994 | Nitta et al. . |
| 5,339,389 | 8/1994 | Bates et al. . |
| 5,339,427 | 8/1994 | Elko et al. . |
| 5,390,328 | 2/1995 | Frey et al. . |
| 5,537,645 | 7/1996 | Henson et al. ......................... 395/726 |

*Primary Examiner*—Jack B. Harvey
*Assistant Examiner*—Ario Etienne
*Attorney, Agent, or Firm*—Richard M. Goldman

[57] ABSTRACT

A method of and system for optimizing process utilization in a shared resource environment that avoids holding system processes while requests are queued or waiting for system resources. Information about a waiting request is retained in control structures; then the same process that frees a resource is utilized to respond to queued requests for that resource. The effect is to minimize the retention and/or allocation of processes and their associated system resource requirements. The same method is applied to the synchronization of interprocess communications.

20 Claims, 6 Drawing Sheets

| TRANSACTION T | | TRANSACTION U | |
|---|---|---|---|
| OPERATIONS | LOCKS | OPERATIONS | LOCKS |
| OpenTransaction | | | |
| TRead (a) | locks a | | |
| | | OpenTransaction | |
| | | TRead (c) | locks c |
| | | TWrite (c+$3) | |
| TRead (b) | locks b | | |
| TWrite (a-$2) | | | |
| | | TRead (b) | waits on T's lock on b |
| TWrite (b+$2) | | | |
| CloseTransaction | unlocks a AND b | | |
| | | TRead (b) succeeds, locking b | |
| | | TWrite (b-$3) | |
| | | CloseTransaction | unlocks b AND c |

FIG. 1

(PRIOR ART)

METHOD FOR CONTROLLING THE LOCKING AND UNLOCKING OF SYSTEM RESOURCES IN A SHARED RESOURCE DISTRIBUTED COMPUTING ENVIRONMENT

FIELD OF THE INVENTION

This invention relates generally to distributed computer processing systems and, more particularly, to resource allocation, including resource locking and unlocking, in distributed processing systems.

BACKGROUND OF THE INVENTION

In a distributed processing system, a computer processor that performs a process communicates with a plurality of remote computer processors over a network. The central computer is generally referred to as a file server (or simply a server) and the remote computer processors are generally referred to as clients. The computer system has a plurality of resources, such as processes, files, pipes, applications, I/O devices, data storage devices (DASD), and the like, connected to the server. A client requests access to a resource, such as a server data file, when the client must use the resource, e.g., read from a data file or write to a data file.

Access to the resources must be managed because, for example, potentially severe conflicts and deadlocks would occur if multiple clients tried to use the same resources simultaneously, e.g., to write data to data files without other clients becoming aware that data in the data files was changing. Likewise, data inconsistencies might result if multiple clients attempted to simultaneously write to the same data file. Computer processing systems, such as described above, can operate in accordance with well-known standards such as the POSIX standard or other UNIX environments.

Resource locking is a way of managing access to system resources, such as I/O devices, or server data files. For data file resources, locks can be Shared (as Read) or Exclusive (as Write).

A server places an exclusive lock on a resource, such as all or a portion of a data file, in order to insure that only one client at a time can change that resource. When a client requests exclusive access to a resource, another client's transaction may already have exclusive access to the resource, such that the new client's request must wait for the resource. When a client's request is granted, the server locks the resource so that only the client that requested the resource may use it. When the client has finished with the exclusive use of the resource, the resource is released, i.e., the server removes the exclusive lock, and another client may use the resource. One effect of locks is a form of serial equivalence. By using locks and waiting the server forces serial equivalence on clients and transactions by ordering them, at least partially, according to the time sequence in which they first access a resource.

In the case of read (shared) access to a resource, multiple clients may be allowed to access the same resource concurrently, as long as no other client has exclusive access to the same resource. That is, read (shared) locks on a resource permit concurrency of other read locks, but cannot be concurrent with write (exclusive) locks on the same resource. When several clients WAIT on the same resource, the semantics of WAIT insure that each client gets its turn.

In the simplest locking system, the server locks any resource that is about to be used by a client's transaction or process, and unlocks all resources that have been used by the client's transaction or process when the transaction or process has been completed or aborted. If a second client attempts to LOCK a resource that is LOCKED by a first client, the second client must WAIT until the resource is UNLOCKED.

Consider FIG. 1, which shows Transactions T and U and resources a, b, and c. When transactions T and U start, it is assumed that resources a, b, and c are UNLOCKED. When client T accesses resource b, resource b is not locked and the server LOCKs it for T. Now, when the client U attempts to access b, b is still LOCKED for client T. Client U WAITs. When client T completes the process, resource b is UNLOCKed, and client U locks resource b and resumes its process. The series of LOCKs and UNLOCKs effectively serializes access to resource b.

A lock typically comprises a control data structure or a stored value in a control data structure. A lock control data structure typically includes information sufficient to identify the client being given the lock, the system resource for which the client has the lock, and the like. A client identified in a lock data structure is said to have possession of that lock or to be holding the lock.

Some locking systems permit queuing of lock requests. Such queuing can eliminate the situation of requesting clients who jump ahead of others in receiving locks for contested resources, thereby assuring that locks are awarded in the sequence that lock requests arrive, without delays that can result from the retry method of handling lock contention.

To avoid complex lock structures and queuing for locks, an alternative is to reject locks when there is contention, asking the lock requestor to retry the lock at a later time. This method allows for relatively simple lock data structures because there is no need to record queued lock waiters.

Management of resource access through locking generally helps provide orderly servicing of client requests, but with the retry method some problems can remain. For example, if a client submits a lock request for access to a resource that is currently locked by another client, the server might respond to the requesting client with an instruction to submit the request again at a later time. That is, the server instructs the client to make a retry later, when the current lock holding client might be finished with its data operations. Unfortunately, the requesting client may find that other clients have submitted lock requests to the server for the same data file while the requesting client was waiting to make its retry and also may find that these other clients have already received their locks. Thus, the later-requesting clients will have effectively jumped ahead of the originally requesting client. This type of situation can undesirably add to the waiting time before a client receives a requested lock. Even if the lock sequence problem is otherwise solved so that locks are awarded in chronological sequence, lock granting may still be saddled with delays. These delays are encountered when the lock becomes available before the requester's lock retry is initiated.

The retry method of resolving resource contention also causes unnecessary additional consumption of communications resources in a distributed environment. The additional communications required for retries also introduce additional delays in distributed environments.

The known method for queuing for resources is to retain the process that represents the queued resource request. A control variable or similar construct, that is associated with the held resource, is used to signal the process that is queued for the resource. This signal is initiated by another process when it frees that resource, making it available to the queued process and the request that queued process represents. This method avoids the problems with the retry method, but consumes processes that handle resource requests by retaining these processes during the period of resource queuing.

SUMMARY OF THE INVENTION

In accordance with the invention described herein, a client-server distributed computer processing system is provided with a method of and system for allocating system resources, or otherwise recording a claim for resources, such resources including synchronization through communications objects between processes in a distributed computer processing system. The system typically includes a server operating in a server environment and multiple clients operating in a client environment. The clients each have access to system resources through the server that administers the resources. Resources are claimed by the server on behalf of the requesting client by locking the resource against concurrent use by another client. Conversely, when a client releases a resource claim, the server unlocks the resource, permitting future or currently waiting claims for the resource to be processed. A "lock" as used herein includes synchronization of processes.

It is, of course, to be understood that while the terms "client" and "server" are used herein, and the invention is described with respect to clients and servers, the method and system of the invention is utilized whenever two or more processes are in contention for one resource. The contending processes may be resident in clients, servers, or the in the same processor environment.

Each client request is handled and represented in the server by a server process. Server processes themselves require a significant set of system resources to operate and complete their work. An example of this set of system resources is a set of storage for control structures that are used to manage the work of the server process as distinguished from other server processes, such a controlling the dispatching of the process in the server. These resources are referred to as server process resources to distinguish them from other resources that are dynamically claimed on behalf of a client, such as shared objects.

Typically, server process resources are preallocated at the time of server initialization and then dynamically assigned as needed for incoming client requests. This preallocation of process resources avoids the time required to dynamically allocate each of the elements of the process resource at the time of a client request arrival.

When a client request arrives it is assigned to one of the available preallocated server processes, If none are available, that client request is queued for an available server process.

A first server process that is assigned to a first client request does the work in the server defined by that request; the first server process then generates a client response to that request. When such a request involves the claim on a system resource, such as a lock on a file or part of a file, and that resource is available immediately (no contention), the resource is claimed as requested and the response to the first client validates that claim.

When a second client request requires a second server process to claim that same resource on behalf of that second client, where that resource has already been claimed by a first client (contended), the second claim is recorded in control structures as queued for the resource. Instead of retaining the second server process, which itself consumes server resources, the second server process, that represents the second client request, is freed after it completes the queuing for the contended client resources (lock).

When the first client eventually follows with a third request that causes the contended resource claim to be released (unlocked), a third server process is allocated to that client request. This third server process releases the contended resource claim; determines that another (second) client is queued for the resource; claims the resource on behalf of that second client; generates a response to the second client's original request, indicating that the resource was claimed as requested; and finally generates a response to the current (second) clients unlock request to confirm successful completion.

The method avoids use of processes and the associated resources during the time when a client request is queued for a shared system resource. It also avoids allocating a new resource when the client request is dequeued (satisfied). Thereby the consumption or allocation of server processes and their resources are minimized.

Those skilled in the art can also apply the method to processes within a client environment that contend for shared client resources.

The method not only applies to contented lock waits on shared resources, but, also applies in general to any situation where a first client request waits for a second client request, even when there is no resource contention. An example of a non-contended wait is the management of named pipes through which clients can establish inter or intra application communications. In this case a first client must wait for a second client to provide data for the named pipe. Although the reason for the wait condition is different than for resource contention, the method of freeing the server process while waiting and using the server process that satisfies the wait condition to send a response to the waiting client is unchanged.

A potential problem with using a first server process associated with a resource release to also send a response to a second client, whose request is satisfied by that resource release, is that such a response may encounter communications delays in completing the send of the response. This problem is addressed in the current invention by reverting back to the allocation of a separate, second process for sending the response to the second client, freeing the first server process to respond to the first client normally and complete normally without being affected by the communications delay. Such use of separate processes for the handling of the responses to both the first and second client is avoided by the invention for normal cases, and is reverted to only for exceptional circumstances.

The preferred embodiment illustrates both the contended and the uncontended wait applications of the method, system, and program product of the invention.

Other features and advantages of the present invention should be apparent from the following description of the preferred embodiment, which illustrates, by way of example, the principles of the invention, both for contended resource waits and for non-contended waits.

BRIEF DESCRIPTION OF THE DRAWINGS

The invention described and claimed herein may be understood by reference to the FIGURES appended hereto.

FIG. 1 is a simplified representation of the LOCK and UNLOCK processes for a client-server system, and is exemplary of the prior art.

DETAILED DESCRIPTION OF THE INVENTION

Figure 2:
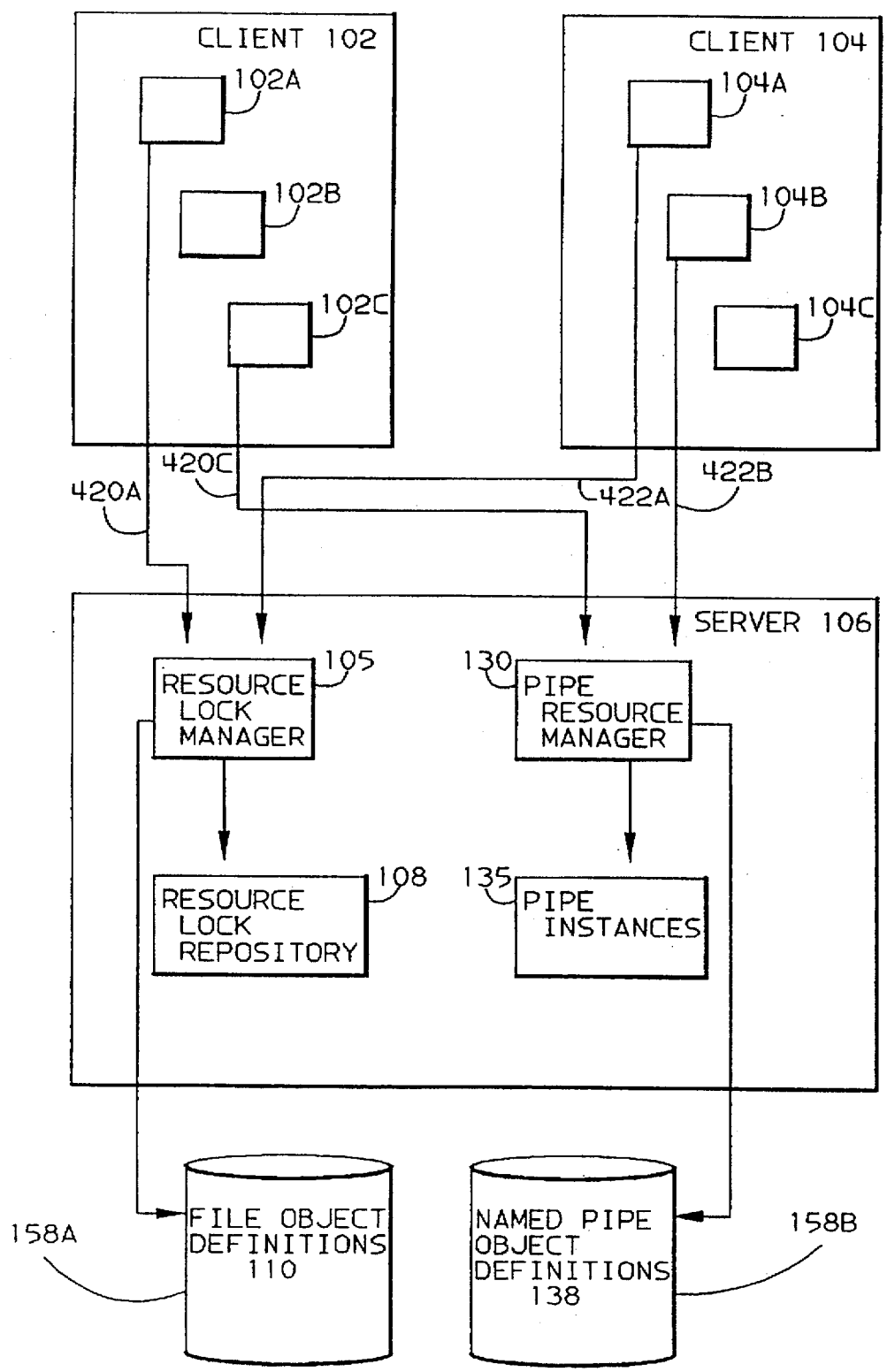
FIG. 2 is a functional block diagram of a computer processing system constructed in accordance with the present invention.

FIG. 2 shows a functional block diagram representation of the distributed data processing system 100 in which remote clients 102, 104 communicate with a server 106. Computer processes, data structures, and operating modules are represented by blocks within each of the respective clients and server. In the first client 102, for example, multiple processes 102A,B,C (104A,B,C in the second client 104) within the client environments request system resources, such as communications through named pipe objects or byte range locks on file objects. In other cases client processes may use the server to synchronize processes, or to accomplish communications between processes in separate client environments through pipes, e.g., named pipe objects. The data lock objects comprise byte ranges within data files 110 (or can encompass entire data files) that are defined and stored in one or more direct access storage devices (DASD) 158A. When multiple clients request locks on the same resource, contention is resolved by the server 106. The server 106 is a common control point or process for handling lock contention between multiple clients or processes. FIG. 2 illustrates two possibly contending resource lock requests, 420A and 422A, originating from Process 102A in Client 102 and Process 104A in Client 104 respectively. These are resolved by a Resource Lock Manager 105 in Server 106, which maintains a Resource Lock Repository 108, which Resource Lock Repository 108 contains control structures for maintaining information in memory about which clients (and their processes) hold locks, or are waiting for locks, and which resources (files for example) are involved with those locks. Files are defined and stored in DASD 110 physical records.

Similarly, FIG. 2 also illustrates two complementary pipe requests, 420C and 422B, originating from Process 102C in Client 102 and Process 104B in Client 104 respectively. One pipe request 420C is a pipe Read operation which may have to wait for a matching pipe Write operation 422B from another client process. The Server 106 includes a Pipe Resource Manager 130 that handles the synchronization of these two pipe operations by recognizing that they resolve to the same named (defined) pipe object and the same open instance of that named pipe, and that they are complementary operations that must be synchronized. That is, one operations must wait for the other complementary operation, causing the pipe Read to wait for the pipe Write. The Pipe Resource Manager manages Pipe Instances 135 which are memory buffers that represent the various active pipes and their currently contained (write) data. Named pipes are defined in DASD 158B physical records 138.

Figure 3:
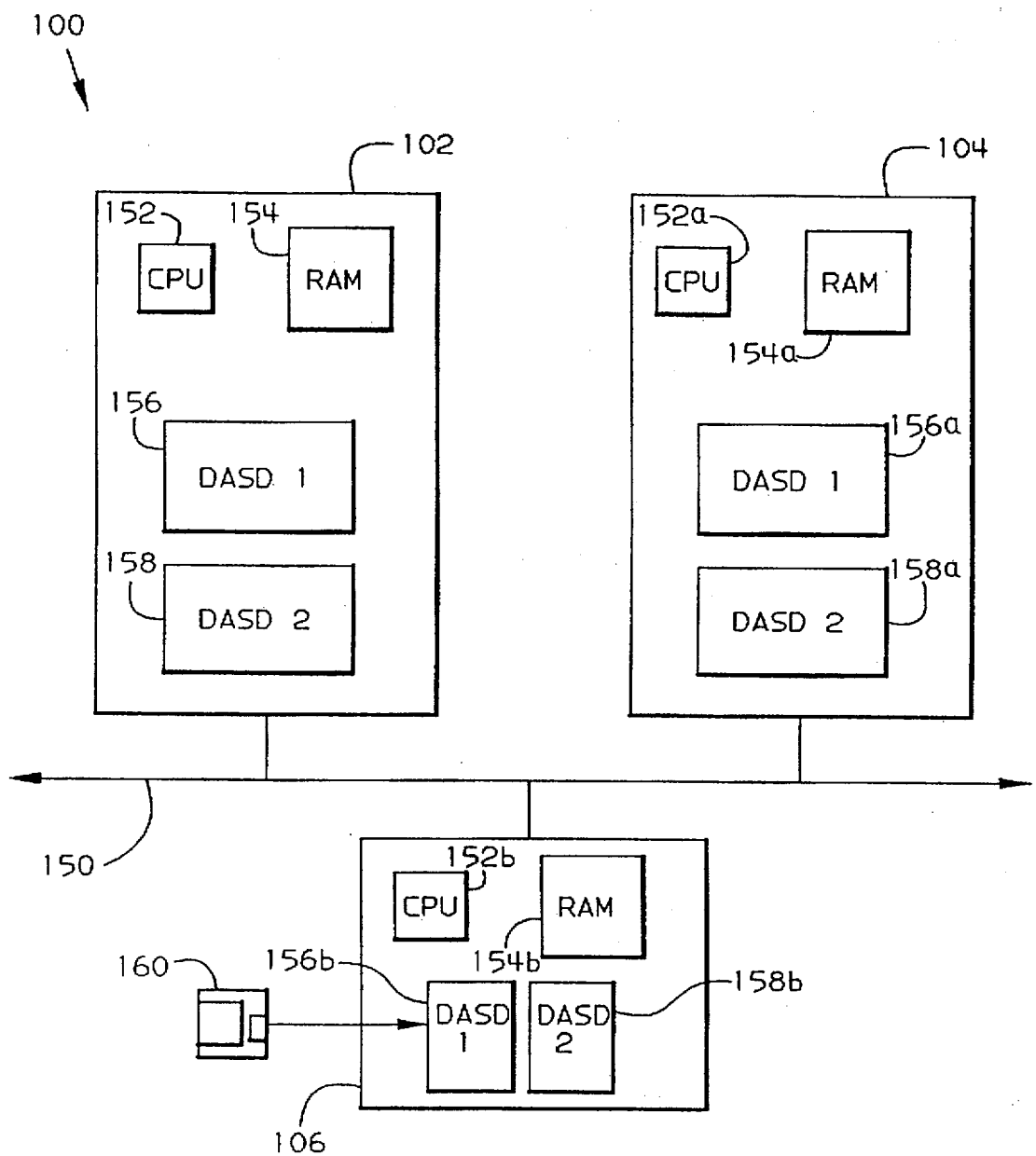
FIG. 3 is a block diagram that shows the construction of the computer processing system illustrated in FIG. 2.

In FIG. 2 and FIG. 3, the two clients illustrated perform similar functions and have similar constructions. Like reference numerals should be understood to refer to like functions and structures. Thus, operating descriptions that are described with reference to the first client 102 should be understood to also apply to the second client 104, unless otherwise noted.

FIG. 3 shows the structural components of the distributed computer system 100 of FIG. 2 and shows that the clients 102, 104 are connected to the server 106 over a network 150. FIG. 3 also shows that each client includes a central processor unit (CPU) 152 and a random access memory (RAM) 154. The CPU retrieves program operating instructions from a program memory section of the RAM and causes execution of the instructions so as to provide the client environment in accordance with the functional illustration of FIG. 2 and as described herein. Each client optionally includes one or more direct access storage devices, shown in FIG. 3 as a first device 156 labelled DASD 1 and a second device 158 labelled DASD 2. The DASD devices can comprise, for example, a floppy disk drive and a hard disk drive.

The second client machine 104 illustrated has a similar structure as the first client machine 102. Such similar construction is indicated by reference numerals within the client block 104 having an "a" suffix. Thus, the client 104 has a CPU 152a, RAM 154a, and direct access storage devices 156a and 158a. Similarly, the server 106 has structure corresponding to the elements shown for the client 102, which are indicated by reference numerals within the server block having a "b" suffix. Thus, the server has a CPU 152b, RAM 154b, and direct access storage devices 156b and 158b. It should be understood that a reference to one of the elements without a suffix includes that element generally, as embodied in any or all of the machines 102, 104, 106 unless indicated otherwise.

In the preferred embodiment, the server 106 and clients 102, 104 are virtual machine environments in one or more mainframe "VM/ESA" systems available from IBM Corporation. They communicate using one of several network communication facilities of "VM/ESA." In such a case, the CPU, RAM, and DASD are all virtual system entities maintained by the "VM/ESA" system. Alternatively, the CPU 152 can comprise a processor such as those commonly used to implement the IBM Corporation "Personal Computer" ("IBM PC") and IBM PC-compatible machines. The CPU also can comprise other processors such as used in the Apple Computer Corporation "Macintosh" line of computers or other more powerful processors commonly used for workstations and the like. In such systems, the server CPU 152b generally is at least as powerful as one of the client CPUs.

The client processes 108 illustrated in FIG. 2 comprise sets of operating instructions that are retrieved from the RAM 154 and executed according to the CPU 152. The operating instructions for the processes 108, as well as the operating instructions for the other functions illustrated in FIG. 2, can be stored on a program storage device having digital storage media, such as a floppy disk 160, and can be read from the program storage device into the program memory of the RAM under control of the CPU by a floppy disk drive, such as the "DASD 1" device 156b of the server 106. The operating instructions can be stored on other suitable program storage devices, such as optical disks and memory cards, in which case the server can be provided with a suitable DASD machine to read the stored instructions such that they can be executed by the CPU 152b. In this way, the program storage device 160 tangibly embodies the program operating instructions that are executed by the CPU.

Figure 4:
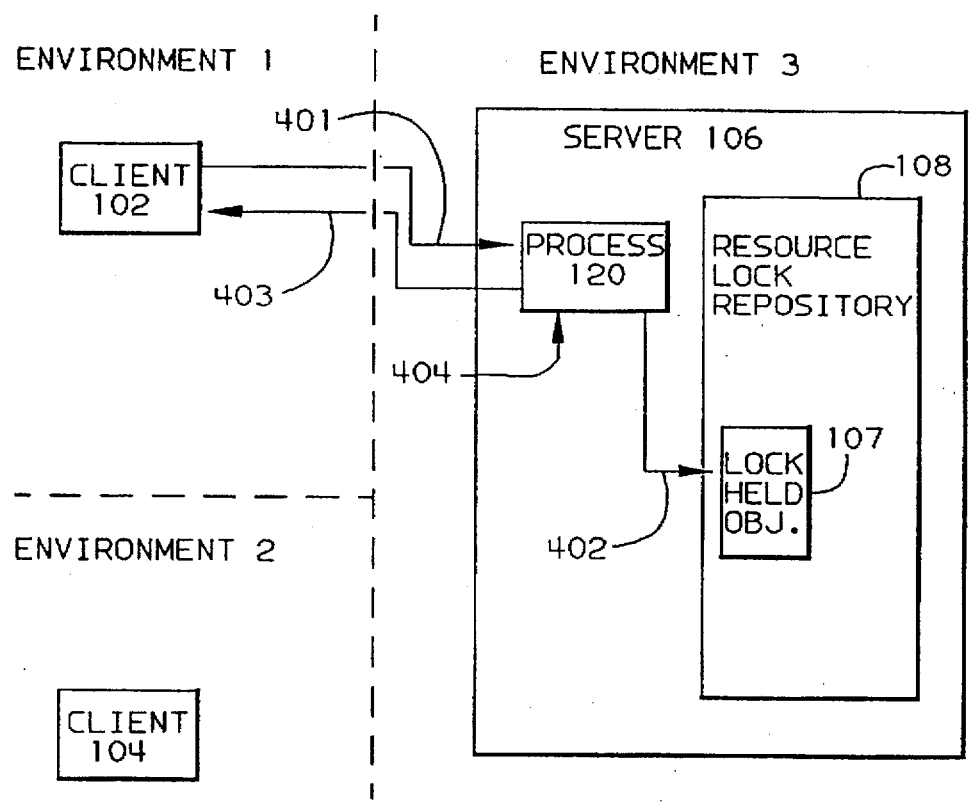
FIG. 4 is a time series of diagrams, FIG. 4A, FIG. 4B, and FIG. 4C, of the process of locking and unlocking multiple LOCK and UNLOCK requests, and resolving conflicts in the method and system of the present invention.
Figure 4:
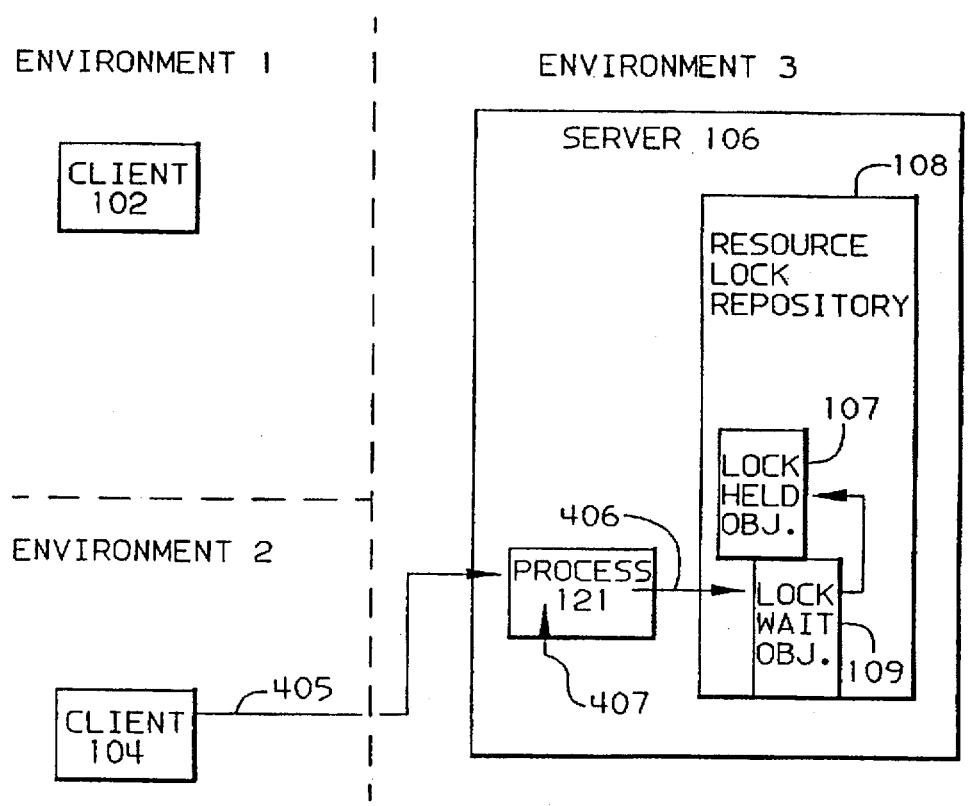
Figure 4:
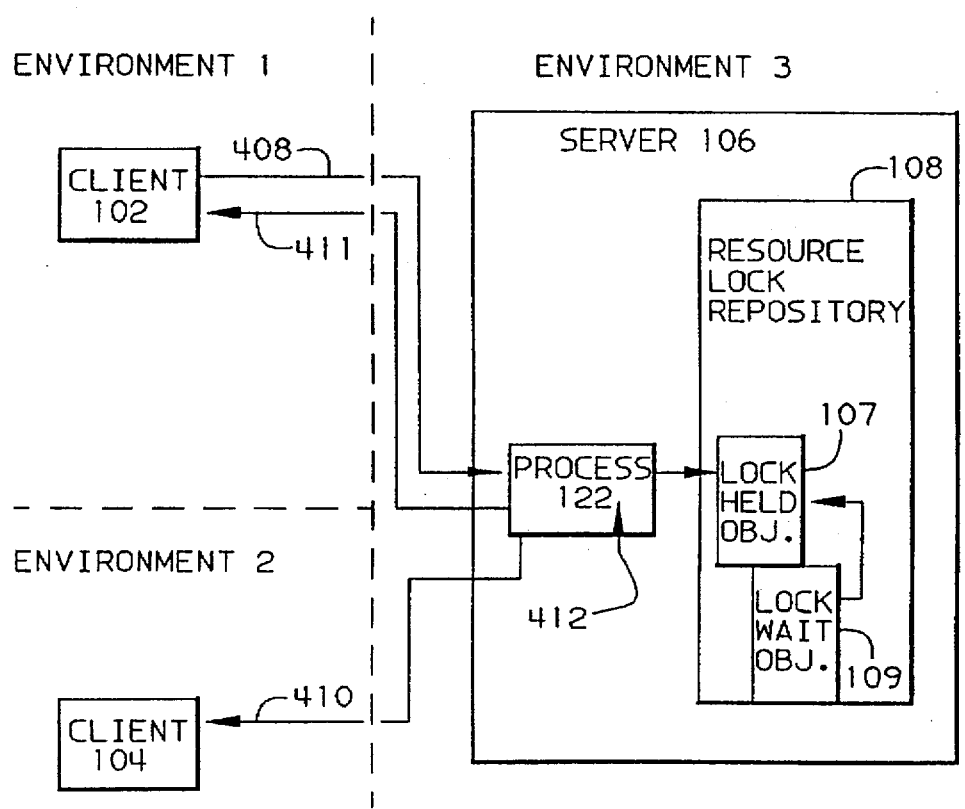

According to the invention described herein, "retry" of the status of locks is avoided, thereby freeing processor 106 resources. As shown in FIG. 4, including FIGS. 4A, 4B, and 4C, according to the invention described herein, a client 102 submits a request to the processor for a LOCK on a resource, such as a file, a byte range of a file, or a named pipe, or opens a pipe or reads from a pipe or writes to a pipe. The request for a LOCK could result in a long WAIT.

A server process is assigned to handle the client request. The server process encounters a resource conflict with another client 104 which holds the desired resource.

Rather than having the requesting server process wait for the release or availability of the requested resource, the server process queues the request for the requested resource. The server process does this by writing a data structure to a control block. This data structure includes all of the information necessary for generating a response to the requesting client 102 when the resource becomes available, or when there is a failure that necessitates notifying the requesting client 102 of a failure. Having done this queuing, and including extra information for handling a response, the server process is freed for reuse. This avoids the problem of holding up server processes during long term WAIT conditions. Meanwhile, the client 102 is still waiting for a response to its request, but without consuming server 106 resources.

Sometime later, the client 104 that held the conflicting resource sends a request to the server 106 to release or unlock the resource. A server process, which could, but need not, be the process that queued the request from client 102, UNLOCKS the resource. The server process not only releases the resource requested by the client 102, but also recognizes that there is another client, waiting for the same resource that is being released. As a result of finding this information about a waiting client, the server process not only releases the resource, but gives it to the waiting client 102. This is done by recoding in the control block a data structure indicating which client now holds the resource. The server process also sends a response to the waiting client 102 indicating that the resource is awarded to the client 102. To send this response to the client 102, the server 106 uses information stored in the queue structures in the server 106. Having provided a response to the client 102, the server process goes on to send a response to the previous client holder (current resource release (unlock) request) 104 of the resource. Thus, the server process handles a current request, and also handles responses to any waiting clients satisfied by the current request. For example, the server or server process stores communications necessary for handling the response to a waiting client or client process in a control data structure waiting the waiting client process.

Neither client 102 nor client 104 is aware of any of this processing. The client 102 simply submits a request to the server 106 and waits for a response. If the resource is available immediately, the response comes back very quickly. If there are conflicts, it takes longer. No server resources are consumed by the clients' waiting.

The invention described herein can be further understood by referring to FIG. 4, made up of FIGS. 4A, 4B, and 4C. As shown therein, a lock waiter is represented by a Lock Wait Object 109 in a Resource Lock Repository 108 in Server 106. Step 401 is a LOCK request from Client 102 and is assigned by the Server 106 to Process 120. In step 402 the lock is recorded as a Lock Held Object 107 in the Resource Lock Repository 108. This object includes a recording of the lock holder (Client 102) and a chain to any waiting (queued) requests for the lock (none in this example). There is no contention for the lock in this case so the lock is awarded immediately. Step 403 is the positive response by Process 120 in Server 106 to the requesting Client 102. Step 404 is the freeing of the handling Process 120, making available its resources for processing other incoming client requests.

Step 405 is a LOCK request by Client 104 for the same resource as is currently held by Client 102. This request is handled by Server 106 Process 121. Step 406 is the enqueuing of Client 104 for the resource through a Lock Wait Object 109. This object includes recording of the lock waiter (Client 104), communications information needed to generate a response to the lock requestor (Client 104), and an association with the Lock Held Object 107. Process 121 is then freed in step 407 and the resources associated with Process 121 are available to handle other incoming client requests. No response is sent to Client 104 which is still waiting for a response to its LOCK request. No process is left in the Server 106 to represent the waiting request.

Step 408 represents an UNLOCK request from the lock holder, Client 102. Process 122 is assigned to that request. Step 409 represents the removal of the Lock Held Object 107 in the Resource Lock Repository 108 and recognition that there is a lock waiter, Client 104, represented by Lock Wait Object 109, queued for the same lock. The lock is now awarded to Client 104 and the Resource Lock Repository 108 is adjusted accordingly to show both the new lock holder (Client 104) and the deletion of the Lock Wait Object 109. Step 410 is the generation of a response to the original lock request of Client 104, a response that was not done by Process 121 originally because Process 121 and its resources in the server 106 were not held around during the lock wait period. To accomplish this preferred LOCK response, it is necessary to use communications information saved in the Lock Wait Object 109 that permits a full response to Client 104 (that is not the Client 102 that originated the current request). In this instance, Process 121 has the responsibility for responding to both its primary client, Client 102, and a secondary client, Client 104. Step 411 is the normal response to the current UNLOCK request. Step 412 is the freeing of Process 122 and its resources, leaving only the Lock Held Object for Client 104 in the Resource Lock Repository 108.

This method and system avoid consuming server process resources, and all that is associated with them.

This method also avoids the alternative of having the client 104 retry later when getting a resource conflict. Such a retry method has the distinct disadvantage of causing extra processing in the client 104, in the server 106, and in the network. The retry method also makes the resources available to the clients later. This is because the resource can become available before the completion of the retry cycle. Unless the server enforces a "first come—first served" system of accounting for client retries, this method can also lead to an unpredictable sequence of resource awards.

It should be obvious without further illustration that there can be multiple waiters for the same resource and that releasing the claim for such a resource by a single request, such as an UNLOCK, can satisfy multiple waiting clients. This occurs, for example, when an exclusive lock (one that permits no concurrent lock holders) holds the resource while multiple shared lock requests (ones that allow multiple concurrent shared lock holders) are queued for the resource. In this case, when the exclusive lock of the resource is released (unlocked), the process that handles the exclusive lock release must also handle the award of multiple shared locks that were waiting, as well as the responses to the clients that originally requested those shared locks. The concept is the same as illustrated in FIGS. 4A, 4B, and 4C, except that multiple resource waiters are satisfied by single resource release (unlock) and the process handling the unlock must therefore handle multiple lock awards and lock responses, represented by multiple Lock Wait Objects.

The method and apparatus described above can be used for waiters for various system resources, including byte range locks and named pipes. For pipes there are several wait conditions. For example an open READ can wait for an open WRITE and vice versa. Similarly a READ can wait for a WRITE and vice versa.

For example, when a named pipe write request satisfies a waiting named pipe read request, the server process that handles the pipe write also handles the pipe read response. This is accomplished by finding a control structure that represents the waiting read. This structure is associated with the particular named pipe in such a way that it can be found by any operation on that particular named pipe. Such a structure includes identification of the waiting client, communications information for sending a response to that waiting client, and buffer(s) for holding the data to be read from the pipe. When a server process that services the pipe write request finds such a structure, it transfers the pipe data written from the named pipe to the read buffer(s) in the control structure; and sends a response to the waiting client, using the communications information in the control structure and the buffer(s) with the data, that is also sent in the response. Then the server process frees the control structure and sends the normal response to the current client requestor for confirmation of the pipe write operation.

A further embodiment of the invention is as a computer program product. By a "computer program product" is meant a computer usable medium, such as one or more floppy discs or tape, or one or more hard discs, or a CD-ROM, having computer readable program code therein or thereon. The computer readable program code can be, for example, optically readable or magnetically readable. The computer readable program code is intended for use with a distributed computing environment having a server operating in a server environment, two or more clients each operating in a client environment, and a plurality of system resources to be allocated and reallocated to and between the clients. The means for allocating the system resources in the distributed computer system among the clients is by responding to client requests for exclusive access to individual ones of said system resources. This is accomplished by the client issuing a lock request to gain access, and surrendering access by issuing an unlock request. The article of manufacture includes computer readable program code for a first client to issue a request to the server for a resource. The resource may be in use by a second client. The article of manufacture further includes computer readable program code for the server to determine the existence of a resource lock indicating a resource conflict between first and second clients, that is, one client is requesting a resource held by a second client. The article of manufacture also includes computer readable program code means for resolving the resource conflict. This includes computer readable program code for initiating enqueuing the first server's request for the resource lock, and thereafter freeing the enqueuing process. Freeing the conflict resolution process releases server resources. The article of manufacture also includes computer readable program code for the second client to thereafter issue a request to unlock the resource. Additionally, the article of manufacture includes computer readable program code for the server to unlock the lock of the second client on the requested resource and grant the request of the first client for a lock of the requested resource.

The present invention has been described above in terms of a presently preferred embodiment so that an understanding of the present invention can be conveyed. There are, however, many configurations of lock managers and operation coordinating wait activities not specifically described herein but with which the present invention is applicable.

The present invention should therefore not be seen as limited to the particular embodiment described herein, but rather, it should be understood that the present invention has wide applicability. All modifications, variations, or equivalent arrangements that are within the scope of the attached claims should therefore be considered to be within the scope of the invention.

I claim:

1. A method of utilizing system resources in a shared resource environment comprising a server operating in a server environment and a plurality of clients operating in a client environment, said clients having access to system resources and requesting access to individual ones of said system resources by issuing a lock request and surrendering access to the individual resource by issuing an unlock request, said method comprising:
   a. a first client issuing a request to the server for a resource in use by a second client;
   b. the server encountering a resource lock indicating a resource conflict between the first and second clients;
   c. the server initiating a first server process, operating on behalf of the first client, which queues the first client's request for the locked resource;
   d. freeing the first server process;
   e. the second client thereafter issuing a request to unlock the resource;
   f. the server initiating a second server process, operating on behalf of the second client, said second server process releasing the lock of the second client on the requested resource, locking the resource on behalf of the first client, sending a response to the first client, and sending a response to the second client; and
   g. freeing the second server process.

2. The method of claim 1 wherein the requested access is exclusive access.

3. The method of claim 1 wherein the resource lock is an exclusive access resource lock.

4. The method of claim 1 wherein the resource is a pipe and the lock is a synchronization for communications.

5. The method of claim 1 wherein the resource is a byte range in a data file.

6. The method of claim 1 wherein the clients and server are within the same environment.

7. The method of claim 1 wherein the clients are virtual processors of a server processor.

8. The method of claim 1 wherein the clients and server are processes within the same environment.

9. The method of claim 1 wherein in queuing the first client's request for the locked resource the server stores in a control data structure the communications necessary for handling the response to the first client and releasing the lock of the second client upon the resource.

10. A client server shared resource environment having a server operating in a server environment, two or more clients each operating in client environments, said system having a plurality of system resources to be allocated and reallocated to said clients, and means for allocating said system resources in the distributed computer system, said clients having access to system resources and requesting access to individual ones of said system resources by issuing a lock request and surrendering access to the individual resource by issuing an unlock request, said means for allocating system resources comprising:
   a. means for a first client to issue a request to the server for a resource in use by a second client;
   b. means for the server to determine the existence of a resource lock indicating a resource conflict between the first and second clients;

c. means for the server to initiate a first server process, operating on behalf of the first client, to enqueue the first client's request for the locked resource, and thereafter free the first server process;

d. means for the second client to thereafter issue a request to unlock the resource; and e. means for the server to initiate a second server process, operating on behalf of the second client, said second server process having means to release the lock of the second client on the requested resource, to lock the resource on behalf of the first client, to send a response to the first client, to send a response to the second client, and to thereafter free the second server process.

11. The system of claim 10 wherein the requested access is exclusive access.

12. The system of claim 10 wherein the resource lock is an exclusive access resource lock.

13. The system of claim 10 wherein the resource is a pipe and the lock is synchronization for communications.

14. The system of claim 10 wherein the resource is a byte range in a data file.

15. The system of claim 10 wherein the clients and server are within the same environment.

16. The system of claim 10 wherein the clients are virtual processors of a server processor.

17. The system of claim 10 wherein the clients and server are processes within the same environment.

18. The system of claim 10 wherein in queuing the first client's request for the locked resource the server stores in a control data structure the communications necessary for handling the response to the first client and releasing the lock of the second client upon the resource.

19. An article of manufacture comprising:

a computer usable medium having computer readable program code means embodied therein for allocating resources in a distributed computing environment having a server operating in a server environment, two or more clients each operating in a client environment, said distributed computing environment having a plurality of system resources to be allocated and reallocated to said clients, said means for allocating the system resources in the distributed computer system among the clients by responding to client requests for access to individual ones of said system resources by issuing a lock request and to client requests for surrendering access to the individual resource by issuing an unlock request, comprising:

a. computer readable program code means for a first client to issue a request to the server for a resource in use by a second client;

b. computer readable program code means for the server to determine the existence of a resource lock indicating a resource conflict between the first and second clients;

c. computer readable program code means for enqueuing the first server's request for the resource lock, and thereafter freeing the enqueuing process;

d. computer readable program code means for the second client to thereafter issue a request to unlock the resource; and e. computer readable program code means for the server to unlock the lock of the second client on the requested resource and grant the request of the first client for a lock of the requested resource.

20. A computer program product for a distributed computing environment having a server operating in a server environment, two or more clients each operating in a client environment, said distributed computing environment having a plurality of system resources to be allocated and reallocated to said clients, said means for allocating the system resources in the distributed computer system among the clients by responding to client requests for access to individual ones of said system resources by issuing a lock request and surrendering access to the individual resource by issuing an unlock request, comprising:

a. computer readable program code means for a first client to issue a request to the server for a resource in use by a second client;

b. computer readable program code means for the server to determine the existence of a resource lock indicating a resource conflict between the first and second clients;

c. computer readable program code means for enqueuing the first server's request for the resource lock, and thereafter freeing the enqueuing process;

d. computer readable program code means for the second client to thereafter issue a request to unlock the resource; and e. computer readable program code means for the server to unlock the lock of the second client on the requested resource and grant the request of the first client for a lock of the requested resource.

* * * * *